A. F. ENGLERTH.
BALL BEARING.
APPLICATION FILED JAN. 2, 1917.

1,220,615.

Patented Mar. 27, 1917.

Witness:
E. Backer
[signature]

Inventor:
Anton F. Englerth
By Charles Turner Brown
Atty.

UNITED STATES PATENT OFFICE.

ANTON F. ENGLERTH, OF CHICAGO, ILLINOIS.

BALL-BEARING.

1,220,615.  Specification of Letters Patent.  Patented Mar. 27, 1917.

Application filed January 2, 1917. Serial No. 140,075.

*To all whom it may concern:*

Be it known that I, ANTON F. ENGLERTH, a subject of the King of Hungary, and a resident of Chicago, in the county of Cook and State of Illinois, have invented certain new and useful Improvements in Ball-Bearings, of which the following, when taken in connection with the drawing accompanying and forming a part hereof, is a specification.

This invention relates to ball bearings wherein the balls are separated from each other, by constructions termed cages, or separators.

The objects of this invention are to obtain; a ball bearing provided with individual separators, one whereof is applied to each ball of the bearing; a bearing in which the balls will only come in contact with the raceways of the device and with their respective separators; a bearing in which the separators of the device come in contact with each other to produce relative movement, and increase the wearing surfaces thereof; a bearing provided with individual separators in which the thrust of a ball against its separator will be transmitted to and received by the remaining separators, and will not be transmitted to or received by the remaining balls of the bearings; and a bearing of the kind recited which is easily and quickly assembled by persons not particularly skilled in mechanics; which is economically made, not readily broken or gotten out or order.

An additional object is to obtain a ball bearing in which, in case a ball is broken, the pieces of said broken ball are not liable to escape from the separator thereof to become mingled with the remaining balls of the bearing.

In the drawing referred to Figure 1, is an end view of a bearing embodying the invention:

Figure 1:
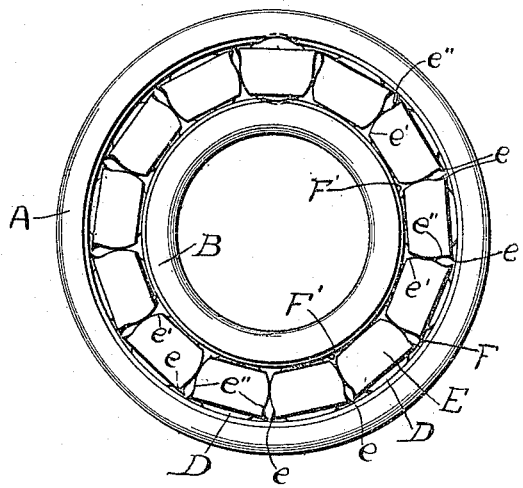
Figure 2:
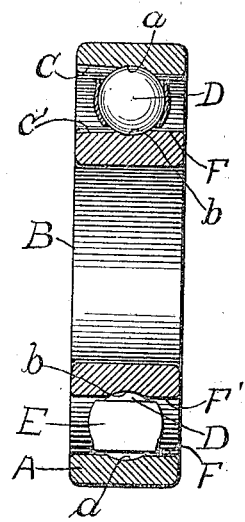
Fig. 2 is a sectional view of the bearing.
Figure 3:
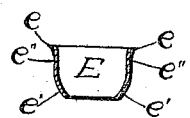
Fig. 3, is a sectional view of a separator forming an element of the bearing.
Figure 4:
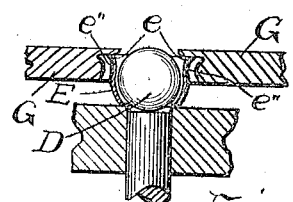
Fig. 4 is a view on line 4—4 of Fig. 5, viewed in the direction indicated by the arrows, showing a ball in elevation, and a ball retainer and the ends of members of a clamping device in section.
Figure 5:
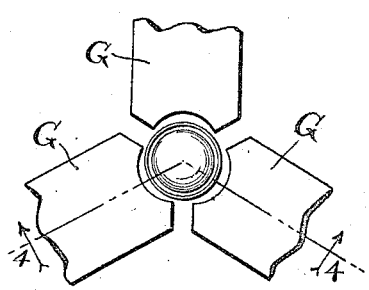
Fig. 5 is a top plan view of a ball, a ball retainer and the ends of members of a clamping device.

The clamping device comprising the members which are partially illustrated in Figs. 4 and 5, is used to force the wall of the separators of the device in, so that said separator will retain its ball therein.

A reference character applied to designate a given part indicates said part throughout the several figures of the drawing, wherever the same appears.

A and B are rings respectively provided with raceways $a$ and $b$. C, C′ are recesses extending from raceways $a$ and $b$, respectively, to the ends of the rings A, B. These recesses C, C′ are used to insert some of the balls in raceways $a$, $b$, in assembling the several parts of the device. D are balls. E are separators, and ball retainers.

The separators E comprise cylindrical walls which flare outwardly, as at $e$, on the ends thereof which are adjacent to the inner periphery F of the outer ring A, and flare inwardly, at the ends thereof which come adjacent to the outer periphery F′ of the inner ring B, (as $e'$).

To aid in assembling the several parts of the bearing I force the wall of the separator E inwardly on a circumferential line (as at $e''$), between the flare $e$ and the ball D, (by forcing jaws G against said wall) a sufficient distance to retain the ball in said separator.

In assembling the parts of the device rings A, B are placed substantially concentric and some of the balls, with the ball separators inclosing them, are placed in the raceways $a$, $b$, and the remainder of the balls (while in their respective separators) are forced through the recesses C, C′ into said raceways.

The balls turn freely in their respective separators and hence, when a ball is forced against its separator said separator transmits the thrust thereon to adjacent separators, but the balls in said adjacent separators do not receive any of said thrust.

I find when one of the rings A, B rotates or turns relative to the other in a bearing constructed as hereinbefore recited, the separators rotate on the axial lines thereof, (which are also radial lines of said rings).

The separators rotate slowly as compared with the rotation of the ring, nevertheless the entire circumference of adjacent separators are brought into contact, so that said separators do not wear, either on the inside or the outside thereof, at a given point, and are thus quite durable.

Each separator is adapted to hold the parts of the ball contained therein, in case the ball becomes broken; and a broken ball with its separator is easily removed from the bearing and a new ball and separator inserted therein.

It will be observed that the length of the cylinder forming the separator E, is less than the distance between the adjacent inner and outer faces of rings A, B, and, of course, less than the diameters of the balls.

I claim:—

1. A ball bearing, comprising an inner and an outer ring respectively provided with raceways, balls arranged to travel in said raceways, in combination with individual separators respectively consisting of cylinders mounted on said balls with the axis of said cylinders on radial lines of said rings, and said cylinders contracted at one and expanded at the other of the open ends thereof.

2. A ball bearing, comprising an inner and an outer ring respectively provided with raceways, balls arranged to travel in said raceways, in combination with individual ball separators and retainers respectively consisting of cylinders mounted on said balls with the axis of said cylinders on radial lines of said rings, said cylinders contracted at one and expanded at the other of the open ends thereof, and also contracted between said expanded end and the ball therein to retain said ball in said cylinder.

3. In a ball bearing, a ball, in combination with a separator arranged to hold said ball, said separator consisting of a cylinder flaring outwardly at one end and inwardly at the other end, the length of said cylinder related to the diameter of said ball so that the bearing surfaces of the ball extend beyond the ends of the cylinder.

ANTON F. ENGLERTH.

In the presence of—
S. JOH. CHRISTENSEN,
GUST. MARCEK.

Copies of this patent may be obtained for five cents each, by addressing the "Commissioner of Patents, Washington, D. C."